United States Patent
Crandall, Jr.

(10) Patent No.: US 6,186,396 B1
(45) Date of Patent: *Feb. 13, 2001

(54) ACCESSIBLE AUTOMATED TRANSACTION MACHINES FOR SIGHT-IMPAIRED PERSONS AND PRINT-DISABLED PERSONS

(75) Inventor: William F. Crandall, Jr., Sausalito, CA (US)

(73) Assignee: Talking Signs, Inc., Baton Rouge, LA (US)

(*) Notice: Under 35 U.S.C. 154(b), the term of this patent shall be extended for 0 days.

This patent is subject to a terminal disclaimer.

(21) Appl. No.: 09/091,576

(22) PCT Filed: Dec. 19, 1996

(86) PCT No.: PCT/US96/20580

§ 371 Date: Aug. 13, 1998

§ 102(e) Date: Aug. 13, 1998

(87) PCT Pub. No.: WO97/22958

PCT Pub. Date: Jun. 26, 1997

Related U.S. Application Data

(63) Continuation-in-part of application No. 08/574,555, filed on Dec. 19, 1995, now Pat. No. 5,616,901.

(51) Int. Cl.[7] .................................................. G06K 19/06
(52) U.S. Cl. .......................................... 235/379; 235/486
(58) Field of Search .................................... 235/379, 362, 235/361, 486; 340/825.49; 902/10, 20, 25; 434/112, 113; 404/42, 10

(56) References Cited

U.S. PATENT DOCUMENTS

| | | | |
|---|---|---|---|
| 4,253,083 | 2/1981 | Imamura | 340/44 |
| 4,593,183 | 6/1986 | Fukatsu | 235/379 |
| 4,660,022 | 4/1987 | Osaka | 340/407 |
| 4,935,907 | 6/1990 | Friedman | 367/118 |
| 5,032,836 | 7/1991 | Ono et al. | 340/825.71 |
| 5,144,894 | 9/1992 | Alonzi et al. | 340/825.49 |
| 5,241,307 | 8/1993 | Bidault et al. | 340/944 |
| 5,284,444 | 2/1994 | Raynes | 434/113 |
| 5,417,574 | 5/1995 | Raynes | 434/112 |
| 5,487,669 | 1/1996 | Kelk | 434/112 |
| 5,616,901 * | 4/1997 | Crandall | 235/379 |

* cited by examiner

Primary Examiner—Thien M. Le
(74) Attorney, Agent, or Firm—Sieberth & Patty, L.L.C.

(57) ABSTRACT

Systems which comprise an automated transaction machine which includes one or more customer interacting means such as, in the case of an integrated circuit card terminal, at least an integrated circuit card reader; infrared communication emitters and individual short range infrared communication emitters located in the machine. The emitters are adapted to provide repeating, directionally sensitive frequency modulated message signals identifying the direction to and location of the machine. Thus, a person having a portable receiver for such signals is led to the machine and is able to position himself/herself in front of the machine in order to operate it. The respective emitters provide separate repeating, directionally sensitive frequency modulated message signal which identifies the location of the respective customer interface on the machine so that by movement of the portable receiver in front of the machine, the location on the machine of the respective customer interfaces can be determined. Instructions on use and/or feedback concerning transactions can also be provided from the system to the customer through the portable receiver. The signal transmitters may also be adapted for highly efficient use in the presence of a wide range of levels of ambient light energy, e.g., sunlight.

25 Claims, 3 Drawing Sheets

ACCESSIBLE AUTOMATED TRANSACTION MACHINES FOR SIGHT-IMPAIRED PERSONS AND PRINT-DISABLED PERSONS

REFERENCE TO RELATED APPLICATIONS

This application is the U.S. national stage of international Application No. PCT/US96/20580 filed Dec. 19, 1996, which is a continuation-in-part of U.S. patent application Ser. No. 08/574,555 filed on Dec. 19, 1995, now U.S. Pat. No. 5,616,901.

TECHNICAL FIELD

This invention relates to automated information and/or monetary transaction systems rendered accessible for sight-impaired persons and print-disabled persons.

GLOSSARY

As used in this description and in the appended claims, the following terms, whether singular or plural and whether capitalized or not, have the following meanings, unless otherwise specified:

"Print-disabled person" is a person who cannot read and understand printed text on account of a physical, developmental, or cognitive disability, or a lack of comprehension of the particular language in which the text is presented.

"Emitter" is a lightwave emitter which is capable of emitting lightwave signals at one or more carrier frequencies (i.e., single or multi-channel) to enable concurrent transmission of different signals.

BACKGROUND

A recent analysis of the National Center for Health Statistics estimated that 4.3 million non-institutionalized people in the United States had difficulty reading the newspaper with their corrected vision—a functional definition of perceived limitations termed "Severe Visual Impairment" (Nelson and Dimitrova, *JVIP*, March, 1993). An additional 2.3 million people also reported difficulty with seeing medium to far distances. Another recent study (Chiang, et. al, *Milbank Quarterly*, 1992) estimates 1.1 million people are legally blind under the definition of tested acuity (<20/200). Many other disabilities prevent persons from reading print. In addition to people who are blind or have low vision and may not be able to see the print, there are many stroke, head-injured, autistic and dyslexic (or even just educationally impaired) persons who may not be able to assimilate printed language even though they can see the page. Many people can accept this information through speech.

In recent years an information and wayfinding system has been developed for assisting blind, low-visioned and otherwise print-handicapped individuals. The system, marketed under the trademark Talking Signs, consists of infrared transmitters and receivers. Transmitters are placed on key signs in the environment which continually transmit the message of the sign. The receiver is carried by the person who activates it when direction or information is desired.

A widely-used, highly popular method of conducting monetary transactions involves use of automatic teller machines, commonly referred to as ATMs. Credit card processing machines, which permit monetary transactions to occur through the use of small cards which carry information about the person to whom the card is issued on a magnetic strip, also remain widely used, as do conventional vending machines, public telephones and the like which accept hard currency. In addition, cards which hold a wide variety of information and which may be credited or debited at a given transaction site, the so-called integrated circuit or "smart" cards, are expected to become widely used in conjunction with card-receiving integrated circuit card readers and located in variety of settings, including, for example, vending machines, checkout counters, copy centers, gasoline station pumps, and just about every other place in which money may be exchanged. As used in this description and in the appended claims, ICC terminal or ICCT shall refer to an integrated circuit card reader in combination with at least one other mechanical or electrical device in such a setting. Each of these automated monetary transaction machines can be used as stand-alone machines, or as components of commercial kiosks used for automated vending of goods or services. Such commercial kiosks are growing in popularity, as are informational kiosks or portals in which a user may obtain a wide variety of information and services from a computer screen or other automated audio and/or visual device (e.g., touch screen monitors) without the need of human assistance. Such commercial and information kiosks (sometimes collectively referred to in this disclosure and the appended claims as information kiosks or IKs) are commonly found today in airport, bus and train terminals, hotels, convention centers, amusement parks, shopping malls, and in many other locations where consumers are seeking information about the surrounding community or place of business. Unfortunately, heretofore such information kiosk systems, ICC terminals, automatic teller machines, conventional credit card processing machines, vending and other coin-operated machines, public telephones and like automated information or monetary transaction machines or terminals (collectively referred to in this disclosure and the appended claims as automated transaction machines or AUTOMACs) have had extremely limited accessibility for sight-impaired persons and print-disabled persons. Even if an AUTOMAC were to be provided with tactile displays, such as instructions in Braille, the individual would have to be at the location of the machine before the person could identify the information it bears. Moreover, the person would have to search for the location of such displays and the location of the relevant customer interacting means of the machine, such as, in the case of automatic teller machines, the bank card reader, the banking record dispenser, the cash dispenser, and slot or other mechanism for receiving bank deposits. And in addition, even after making use of the AUTOMAC the person would have to make the assumption that the desired monetary or informational transactions were in fact accomplished. No positive on-the-spot reassuring feedback is available to the sight-impaired person or the print-disabled person.

A need thus exists for an effective way by which an AUTOMAC can be rendered accessible and user-friendly to sight-impaired persons and to print-disabled persons, without in any way diminishing the utility of the machine for persons who are not sight-impaired or print-disabled. In fulfilling this need, it is also highly important not to interfere with the operation of the machine, or necessitate major or costly modification of machine apparatus. This invention is deemed to fulfill this need and to satisfy these requirements in a highly effective and efficient manner.

SUMMARY OF THE INVENTION

The present solution to the problem of providing accessible, user-friendly electronic automated transaction systems for use by sight-impaired persons and by print-disabled persons approaches the problem at various interrelated levels—each level going technically deeper into the system. The first level or step provides an effective way to identify the existence of and location of the automated transaction machine. At the second level there is provided an information output mechanism to the customer appropriate to the customer's needs, once the customer has located the automated transaction machine. And at the third level, there is provided an information input mechanism from the customer and an information output to the customer, both appropriate to the customer's abilities.

In one of its embodiments this invention provides an automated transaction system rendered accessible for sight-impaired persons and print-disabled persons, which system comprises: (a) an automated transaction machine which includes one or more customer interacting means such as, for example, in an ICC terminal, at least an integrated circuit card reader, or in an information kiosk, at least an interactive audio and/or visual device; (b) infrared remote communication means providing repeating, directionally sensitive frequency modulated message signals identifying the direction to and location of the machine such that a person having a portable receiver for said signals is led to and enabled to position himself/herself in a proximate operative relationship with the machine; and (c) individual short range infrared communication means in the machine, each said short range infrared communication means providing at least a separate repeating, directionally sensitive frequency modulated message signal identifying the location of the respective customer interacting means on the machine such that said person can by suitable movement of such portable receiver in proximity to the machine identify the location on the machine of the respective customer interacting means. In the context of information kiosks, non-limiting examples of suitable interactive audio and/or visual devices may include a touch screen computer monitor, a touch-sensitive information directory using a keypad or other array of buttons connected to speakers, a voice-recognition system which responds to voice commands or inquiries with video or sound, or a visual display of information regarding use of mechanical devices associated with the kiosk (e.g., mail boxes, night deposit boxes, etc.). In addition the systems of this invention preferably also include short range infrared interactive communication means in the automated transaction machine providing frequency modulated message signals for conveying transaction information to the receiver of the person while located in an operative relationship with the machine. The transaction information can at least in part be transmitted in response to use or actuation by the person of respective customer interacting means of the AUTOMAC and thereby serve as positive feedback to the person operating the AUTOMAC. Using the principles of this invention, still other types of interactive communication can be programmed into the system to provide other information to the customer on request, such as instructions on how to initiate and terminate use of the AUTOMAC and its components, specific information for various applications of AUTOMACS, including for example, account balance information, current interest rates, transaction summaries, current prices, new products, preferred routes of travel from one place to another, directories of available information and services, and so forth.

Item (a) above can be any type of AUTOMAC which enables the user to conduct a monetary or information transaction without the presence of another human being, when desirable, including for example, banking transactions such as withdrawal of money from one's account or depositing money to one's account, payment of charges for goods or services at vending machines, checkout counters, toll gates, and the like wherever it is desirable to automate the exchange of money or credit for goods or services. Devices of this type are in widespread use and thus further description is deemed unnecessary. Without in any way limiting the scope of this invention to any particular type of machine, one interested in descriptions of devices of this type particularly adapted for use as automatic teller machines may refer, for example, to U.S. Pat. No. 4,314,352 to H. D. Fought; U.S. Pat. No. 4,318,354 to L. A. Fish and U.S. Pat. No. 5,382,777 to T. Yuhara et al.; for integrated card readers may refer, for example, to U.S. Pat. No. 4,926,032 to Shimamura, et al., U.S. Pat. No. 5,012,078 to Pernet, and U.S. Pat. No. 5,557,516 to Hogan; and for information or commercial kiosks may refer, for example, to U.S. Pat. No. 4,817,043 to Brown, U.S. Pat. No. 5,369,258 to Sansone et al., U.S. Pat. No. 5,499,707 to Steury, and U.S. Pat. No. 5,513,117 to Small; and references cited therein.

Infrared remote communication means (b) above is/are particularly appropriate for open spaces where tactile signs are inappropriate; they label the environment for distant viewing. Such means operate in a "broadcast" mode and allow sight-disabled or print-impaired people to directly know not only what the item is, but where the item is. Just as sighted persons visually scan the environment to acquire both label and direction information, means (b) above directly orients the person to the labeled goal and constantly updates the person as to progress to that goal. That is, unlike Braille, raised letters, or voice signs which passively label some location or give mobility instructions to some goal, infrared means (b) above, which typically is in the form of an array of infrared emitters, provides a repeating, directionally selective voice message or a series of such messages at least one of which originates at the location of the AUTOMAC and others of which may emanate from places leading to that location. All such messages are transmitted to a personal or portable (e.g., hand-held) receiver. The direction selectivity is a characteristic of the infrared message beam and ensures that the person using the device gets constant feedback about his or her relative location to the goal as she or he moves towards it.

Means (c) above enables the customer, when suitably positioned relative to the AUTOMAC—usually directly in front of it and close enough to operate the customer interacting means thereof, such as, in the case of automatic teller machines, a bank card reader, a banking record dispenser, a cash dispenser, and a receptacle or slot for receiving bank deposits—to first locate the precise position of the customer interacting means and then to perform the desired functions. To locate the precise position of the customer interacting means the customer need only slowly sweep the receiver across the face of the AUTOMAC. As the beam of each infrared emitter is encountered it communicates to the receiver and thence to the customer not only what customer interacting means is at, or in close proximity to, the source of that infrared signal, but precisely where that customer interacting means is located on the AUTOMAC. Indeed, by moving the receiver to trace the signal beam back to the surface of the machine, the customer can then manually touch and learn the configuration of the interacting means. The signal can also be programmed to give instructions on how to operate that particular customer interacting means and in what direction to move the receiver to find the other customer interacting means that the customer may wish to find. Means (c) can also be programmed to provide feedback to the customer to confirm the extent, nature and/or completion of the transaction. Alternatively, separate means (d) can be included in the system for providing such feedback and, to whatever extent desired, other forms of interaction with the customer.

The system thus conveys transaction information to the receiver of the customer as the customer conducts the selected operations made possible by the AUTOMAC. For example, in the case of ATMs, the means of (c) or (d) can be programmed to inform the customer whether the proper PIN code has been entered and that subsequent entries to the ATM are operating under the desired menus by virtue of proper key presses and properly synchronized responses to such key presses. Similarly, if the amount of a cash withdrawal requested exceeds the account balance, the signal from means (c) (or (d) if used) can be programmed to inform the customer of the situation, what account balance is available for withdrawal, and what can be done under the circumstances, and how to proceed with the approach the customer elects to pursue (e.g., proceed with a more limited permissible cash withdrawal or cancel the entire proposed transaction).

Means of (c) and (d) above typically operate in a "narrowcast" mode can be arranged to emanate from the same or different infrared emitters. The emitters and the electronics associated therewith are preferably placed within the cabinet or housing of the AUTOMAC. In this way the system is rendered vandal-resistant and inconspicuous to sighted individuals. The infrared transmitters themselves are relatively small physically. For example, a 4×4 inch circuit board can readily accommodate the speech, clock and infrared LED driver circuits. In a particularly preferred embodiment, the frequency modulated message signal is a lightwave signal of variable intensity, and one or more of the infrared transmitters comprises (i) an emitter for sending the frequency modulated lightwave signal, (ii) a light energy receiver for detecting a change in the level of surrounding ambient light energy and for producing a response to such change in proportion to the change detected, and (iii) a controller for adjusting, directly or indirectly, the frequency modulated lightwave signal in response to the light energy receiver response to the change detected. This feature enables the transmitted signal to be conditioned for consistent and reliable transmission even under a wide variety of ambient light energy conditions. This preferred transmitter is described in greater detail in commonly owned, copending U.S. patent application Ser. No. 08/754,275 filed on Nov. 20, 1996, now U.S. Pat. No. 5,757,530.

Also in preferred arrangements, the infrared emitters are placed in or immediately behind small apertures (e.g., 0.125 inch diameter) in the front face or panel of the AUTOMAC or in small bezels attached to and through the front face or panel of the AUTOMAC. A preferred bezel is disclosed in commonly-assigned U.S. patent applications Ser. Nos. 08/539,358, and 29/044,997, both filed Oct. 5, 1995, the disclosures of which are incorporated herein in toto by reference for all purposes. An advantage of all such arrangements is that not only are the infrared signals easily detected by the customer's receiver but the customer's body serves as a light shield to ensure that only the customer's receiver would pick up the transaction information.

In all cases, the infrared signals utilized in the systems of this invention are picked up by a portable directional receiver which typically comprises (i) a non-visual communicator such as a small audio speaker or small audio earphone system, (ii) a self-contained source of electrical energy, (iii) a detector for receiving a sensed frequency modulated infrared signal, and (iv) electronics converting the sensed signal into intelligible non-visual communication emanating from the communicator. Suitable receivers are available from Talking Signs, Inc., Baton Rouge, La., and information concerning such devices has been published. A particularly preferred portable directional receiver for such use is described in detail in commonly-assigned co-pending application Ser. No. 08/496,970, filed Jun. 30, 1995, all disclosure of which is incorporated herein by reference for all purposes. The receiver therein described has the advantage, inter alia, of giving good performance even when the receiver is used under a wide range of ambient light energy level conditions.

DESCRIPTION OF PREFERRED EMBODIMENTS

As noted above, automated transaction machines as defined herein are well known and, standing alone, form no part of this invention. Likewise a remote infrared information and wayfinding system has been developed and is available for use as the infrared remote communication means (b) above. These systems are marketed under the trademark Talking Signs by Talking Signs, Inc., Baton Rouge, La., and further information concerning such systems can be found, for example, in a book published by The Smith-Kettlewell Eye Research Institute (San Francisco, Calif.) entitled *Remote Signage for the Blind and Print Handicapped*. Although standing alone neither means (a) nor means (b) above is novel per se, so far as is known, the combination of means (a) and means (b) is itself novel.

Figure 1:
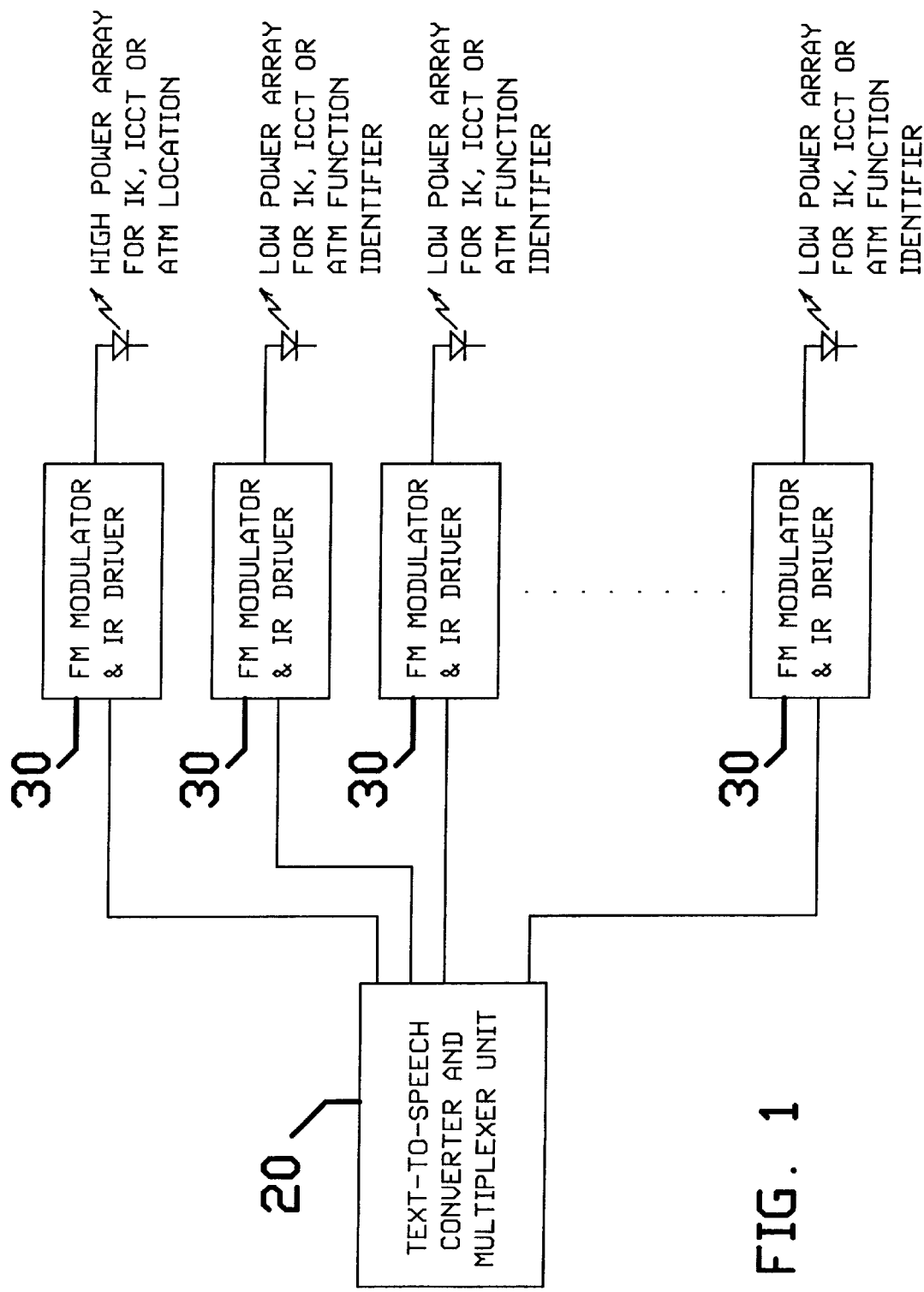
FIG. 1 is a block diagram illustrating a typical system of this invention for installation in an information or commercial kiosk (IK), an integrated circuit card terminal (ICCT), or an automatic teller machine (ATM) to serve both as one of the individual long range infrared communication means (b) above and as a plurality of short range infrared communication means (c) above (and (d) above, if used as separate means).

Turning now to the system in the form depicted in FIG. 1, output from an analog feed or, alternatively, a TEXT-TO-SPEECH CONVERTER AND MULTIPLEXER UNIT 20 is received and processed by a plurality of FM MODULATOR & IR DRIVERS 30, the respective outputs from which are emitted by suitably powered arrays of single channel emitters each of which delivers a frequency modulated infrared signal. In FIG. 1 the array serving as means (b) above is referred to as the "HIGH POWER ARRAY FOR IK, ICCT OR ATM LOCATION". Each individual means (c) (and means (d), if used separately) is referred to in FIG. 1 as "LOW POWER ARRAY FOR IK, ICCT OR ATM FUNCTION IDENTIFIER". Any suitable number of such high and low power arrays and their respective modulators and drivers 30 can be provided as deemed necessary or appropriate for any given AUTOMAC installation.

The individual high and low power arrays serving respectively as the remote communication means (b), and the short range infrared locator communication means (c) (and (d) if used separately) typically comprise an array of single or multi-channel emitters each of the emitters delivering a frequency modulated infrared signal in the pattern of a cone having a beam width in the range of about 10° to about 50° at a modulated frequency of about 25 KHz for single channel transmission, or in the range of about 16 to about 34 KHz for multi-channel signal transmission, with a band width in the range of about 3 to about 6 KHz and having an infrared carrier frequency in the range of about 850 to about 950 nanometers. When combined into an array, the emitters may in effect emit a signal having a beam width of up to 360°, if desired. If desired, the signal may be conditioned to have a subcarrier deviation of about 2.5 KHz and a modulation index of 0.76. While these are the preferred frequencies, band widths and carrier frequencies, various combinations of different frequencies, band widths and carrier frequencies may be used and are within the scope of this invention, so long as the effective transmission of a signal is accomplished. While infrared lightwave emitters are preferred, the lightwave used may be any within the spectrum. A principal difference between the high and low power arrays resides in the excitation power to the diode. Also, depending on the size of the automated transaction machine, the cone beam width of the individual low power arrays may be narrower than that of a high power array. Text-to-speech converter and multiplexer units 20 are available as articles of commerce.

Figure 2A:
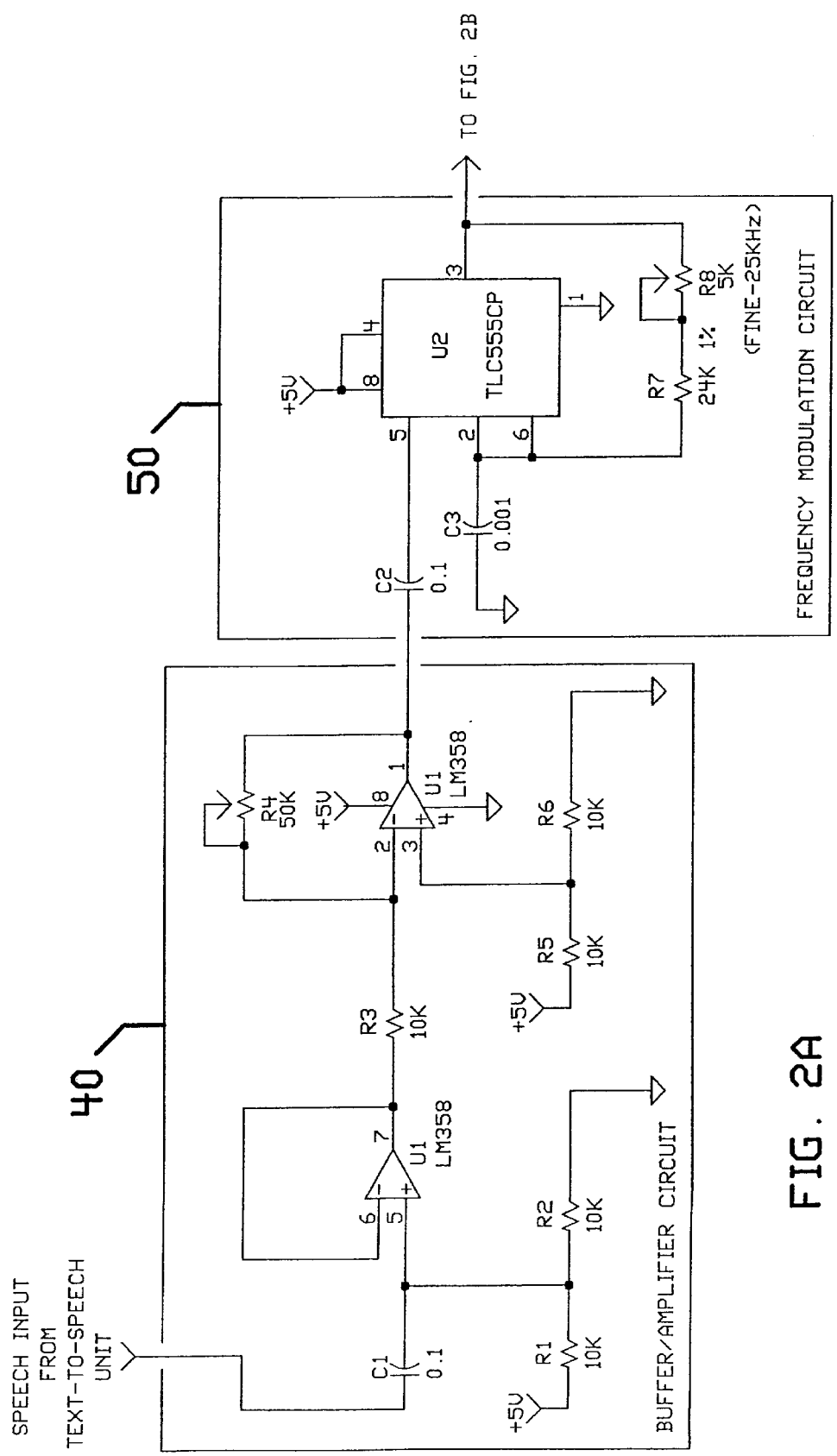
FIG. 2A is one-half of a circuit diagram for a typical frequency modulation circuit and associated infrared driver network for use in a system of FIG. 1.
Figure 2B:
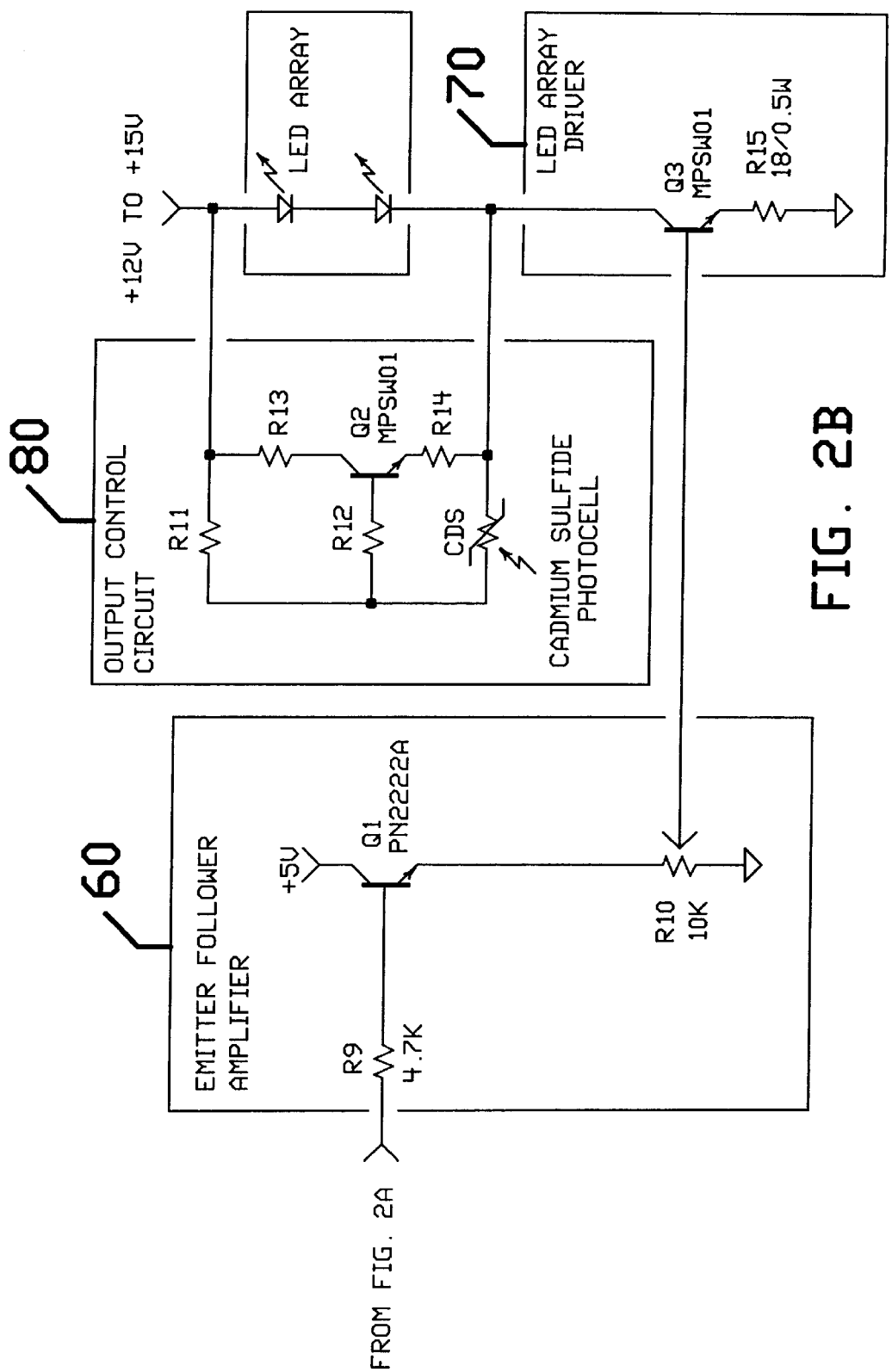
FIG. 2B is the other half of the circuit diagram partially illustrated in FIG. 2A.

Taken together, FIGS. 2A and 2B illustrate the electronics and circuitry of a preferred embodiment of this invention for generating the infrared signal for transmission by an array composed of one or more infrared LEDs in a series configuration. As shown in those two figures, the system processing the output signal from the text-to-speech unit for ultimate transmission via the infrared emitters comprises a buffer/amplifier circuit 40, a frequency modulation circuit 50, an emitter follower amplifier 60, an LED array driver 70, and a controller in the form of an output control circuit 80, the respective components of which are set forth in FIG. 2 itself. As can be seen from FIG. 2A, the analog signal from the text-to-speech unit is input to the buffer amplifier circuit of U1 via capacitor C1. The gain is determined by the value of potentiometer R4, adjustable for gains from 0 to 5. The output signal from buffer/amplifier circuit 40 is directed to the frequency modulation circuit of U2 via capacitor C2. Frequency modulation circuit 50 converts the amplified analog voltage signal from circuit 40 into a frequency modulated signal centered at a carrier frequency of 25 KHz. The carrier frequency is set by adjustment of potentiometer R8. The frequency modulated output from circuit 50 is transferred to the emitter follower amplifier of transistor Q1 via resistor R9 (FIG. 2B). The potentiometer R10 of amplifier 60 is used to excite the base of the LED array driver of Q3. The resistor R15 of LED array driver 70 is selected to limit the current flowing in the collector circuit containing the LED array (composed of one or more infrared LEDs in a series configuration) and the output control circuit 80 to prevent damage to the array due to excessive current flow. The power supply to the LED array is in the voltage range from +12 VDC to +15 VDC. Output control circuit 80 shunts current away from the LED array through transistor Q2 in inverse proportion to the ambient light energy detected by cadmium sulfide photocell CDS of output control circuit 80. In this way, output control circuit 80 controls the LED array output based upon the level of surrounding ambient light energy detected, and provides a method of regulating the effective range of the transmitters employed to optimize the signal for the particular application at hand to insure a constant, reproducible and reliable range of effective transmission.

As noted above, the infrared remote communication means (b) above operate(s) in a "broadcast" mode whereas the short range infrared communication means operate in a "narrowcast" mode. This differentiation can be readily accomplished by regulating the excitation power to the respective emitter diodes. Thus typically the excitation power to the diode of means (b) above will be in the range of at least about 10 milliwatts up to about 1000 milliwatts, whereas the "narrowcast" operation of the short range diodes such as means (c) is typically effected by use of excitation power in the range of about 1 to about 10 milliwatts. In will be understood and appreciated, however, that departures from these ranges may be made whenever deemed necessary or desirable in any given situation, and such departures are within the ambit of this invention.

The instructions and information programmed into the systems for transmission to the customer via the infrared signals is preferably in universal ASCII format, but can be in the form of an analog format or a binary code that provides for a voice message equivalence. Preferably, the voice message equivalence is digitally recorded natural speech. However, the voice message equivalence can be synthesized speech, if desired.

In one of its variant forms, this invention provides a control box to be used by the disabled person in conducting transactions with the AUTOMAC, once such person has been led by the system to a suitable location proximate to the AUTOMAC. If the customer is a Braille-reading person, the control box has labelled buttons and a Braille display of electromechanical pins with which all commands are transmitted to the AUTOMAC of a system of this invention and with which all feedback from such AUTOMAC are received by the person via tactile communication. In the case of a severely disabled person requiring a joystick or chin operated controls, the control box is appropriately configured for use by the disabled person in actuating the AUTOMAC system by means of the control box. In such case the control box is configured to receive the feedback in whatever manner is necessary or appropriate given the nature of the disablement.

The light energy receiver of this invention may be any device capable of detecting a change in the level of surrounding ambient light energy and producing a response to such change in proportion to the change detected. The response produced may take the form of a change in resistance at the terminal location of the receiver in the circuitry, or it may take the form of other changes in the electrical characteristics of the receiver at such terminal. For example, a change in voltage in the case of photogenerative devices, conductivity in the case of a photoresistive device, a change in reactance in the case of photoreactive devices (i.e., devices which change either capacitance or inductance as a function of changes in light energy detected), etc. may also be generated by the light energy receiver, as long as the response produced is in some proportion (directly or inversely, linearly or nonlinearly) to the detected changes in ambient light levels. Preferably, the light energy receiver is a photocell having a resistance which is inversely proportional to the ambient light energy detected. Particularly preferred is a cadmium sulfide photocell having these resistance characteristics and a nominal resistance in the range of about 25 Kilohms to about 2 Megohms.

The controller component may be any device capable of adjusting, directly or indirectly, the frequency modulated lightwave signal in response to the light energy receiver response to the change detected. By directly or indirectly it is meant that the controller may operate directly to control the strength of the lightwave signal produced by the transmitter within the transmitter itself, or may operate indirectly by adjusting the strength of the signal input to emitter, i.e., the LED array. The magnitude of the adjustment will depend in part upon the particular controller employed. Preferably, the controller is an output control circuit as previously described.

The entire disclosure of each and every U.S. patent and of each and every journal article, book or other publication of any kind, referred to in any portion of this specification is incorporated herein by reference for all purposes.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

What is claimed is:

1. A automated transaction system rendered accessible for sight-impaired persons and print-disabled persons, which system comprises:
    a) an automated transaction machine which includes one or more customer interacting means;
    b) infrared remote communication means providing repeating, directionally sensitive frequency modulated message signals identifying the direction to and location of the machine such that a person having a portable receiver for said signals is led to and enabled to position himself/herself in a proximate operative relationship with the machine; and
    c) individual short range infrared communication means in the machine, each said short range infrared communication means providing a separate repeating, directionally sensitive frequency modulated message signal which at least identifies the location of the respective customer interacting means on the machine such that said person can by movement of such portable receiver identify the location on the machine of the respective customer interacting means thereof.

2. A system of claim 1 wherein said short range infrared communication means in the machine also provide frequency modulated message signals for conveying transaction information to the receiver of said person while located in an operative relationship with the machine, said information being in response to actions taken by the person using one or more of said customer interacting means.

3. A system of claim 1 wherein said machine is an integrated circuit card terminal and wherein said customer interacting means comprises at least an integrated circuit card reader.

4. A system of claim 1 wherein said infrared remote communication means and said individual short range infrared communication means comprise separate arrays of emitters each of said emitters delivering a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers, said remote communication means being operated at a higher power input than said short range infrared communication means.

5. A system of claim 4 wherein said machine is a integrated circuit card terminal and wherein said customer interacting means comprises at least an integrated circuit card reader.

6. A system of claim 4 wherein said system further comprises separate short range infrared communication means in the machine to provide frequency modulated message signals for conveying transaction information to the receiver of said person while located in an operative relationship with the machine, said information being in response to actions taken by the person using one or more of said customer interacting means.

7. A system of claims 1 wherein said machine is an information kiosk and wherein said customer interacting means comprise at least an interactive audio and/or visual device.

8. A system of claims 4 wherein said machine is an information kiosk and wherein said customer interacting means comprise at least an interactive audio and/or visual device.

9. A system of claim 1 wherein at least one of said infrared remote communication means and said individual short range infrared communication means comprises (i) an emitter for sending the respective frequency modulated infrared signal, (ii) a light energy receiver for detecting a change in the level of surrounding ambient light energy and for producing a response to such change in proportion to the change detected, and (iii) a controller for adjusting, directly or indirectly, the frequency modulated infrared signal in response to the light energy receiver response to the change detected.

10. An automated transaction system rendered accessible for sight-impaired persons and print-disabled persons, which system comprises:
    a) an integrated circuit card terminal which includes as customer interacting means thereof, at least an integrated circuit card reader;
    b) one or more infrared remote communication means providing repeating, directionally sensitive frequency modulated message signals identifying the direction to and location of the terminal such that a person having a portable receiver for said signals is led to and enabled to position himself/herself in a proximate operative relationship with the terminal;
    c) individual short range infrared locator communication means in the terminal, each said short range infrared locator communication means providing a separate repeating, directionally sensitive frequency modulated message signal which at least identifies and leads to the location on the terminal of the respective customer interacting means such that said person can by movement of such portable receiver identify the location of the respective customer interacting means; and
    d) one or more short range infrared interactive communication means in the terminal providing frequency modulated message signals for conveying transaction information to the receiver of said person while located in an operative relationship with the terminal.

11. A system of claim 10 wherein said remote communication means comprises an array of emitters each of said emitters delivering a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

12. A system of claim 10 wherein each said short range infrared locator communication means comprises at least one emitter which delivers a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

13. A system of claim 10 wherein said short range infrared interactive communication means comprises at least one emitter which delivers a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

14. A system of claim 10 wherein the instructions and information programmed into at least (i) said short range infrared locator communication means and (ii) said short range infrared interactive communication means is either in universal ASCII format, analog format, or a binary code that provides for a voice message equivalence.

15. A system of claim 14 wherein the voice message equivalence is digitally recorded natural speech.

16. A system of claim 14 wherein the voice message equivalence is synthesized speech.

17. A system of claim 10 wherein at least one of said infrared remote communication means and said individual short range infrared communication means comprises (i) an emitter for sending the respective frequency modulated infrared signal, (ii) a light energy receiver for detecting a change in the level of surrounding ambient light energy and for producing a response to such change in proportion to the change detected, and (iii) a controller for adjusting, directly or indirectly, the frequency modulated infrared signal in response to the light energy receiver response to the change detected.

18. An automated transaction system rendered accessible for sight-impaired persons and print-disabled persons, which system comprises:

a) an information kiosk which includes as customer interacting means thereof, at least an interactive audio and/or visual device;

b) one or more infrared remote communication means providing repeating, directionally sensitive frequency modulated message signals identifying the direction to and location of the kiosk such that a person having a portable receiver for said signals is led to and enabled to position himself/herself in a proximate operative relationship with the kiosk;

c) individual short range infrared locator communication means in the kiosk, each said short range infrared locator communication means providing a separate repeating, directionally sensitive frequency modulated message signal which at least identifies and leads to the location on the kiosk of the respective customer interacting means such that said person can by movement of such portable receiver identify the location of the respective customer interacting means; and d) one or more short range infrared interactive communication means in the kiosk providing frequency modulated message signals for conveying transaction information to the receiver of said person while located in an operative relationship with the kiosk.

19. A system of claim 18 wherein said remote communication means comprises an array of emitters each of said emitters delivering a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

20. A system of claim 18 wherein each said short range infrared locator communication means comprises at least one emitter which delivers a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

21. A system of claim 18 wherein said short range infrared interactive communication means comprises at least one emitter which delivers a frequency modulated infrared signal in the pattern of a cone having a beam width in the range of about 10° to about 50° at a modulated frequency of about 25 KHz with a band width in the range of about 3 to about 6 KHz and having an infrared carrier frequency in the range of about 850 to about 950 nanometers.

22. A system of claim 18 wherein the instructions and information programmed into at least (i) said short range infrared locator communication means and (ii) said short range infrared interactive communication means is either in universal ASCII format, analog format, or a binary code that provides for a voice message equivalence.

23. A system of claim 22 wherein the voice message equivalence is digitally recorded natural speech.

24. A system of claim 22 wherein the voice message equivalence is synthesized speech.

25. A system of claim 18 wherein at least one of said infrared remote communication means and said individual short range infrared communication means comprises (i) an emitter for sending the respective frequency modulated infrared signal, (ii) a light energy receiver for detecting a change in the level of surrounding ambient light energy and for producing a response to such change in proportion to the change detected, and (iii) a controller for adjusting, directly or indirectly, the frequency modulated infrared signal in response to the light energy receiver response to the change detected.

* * * * *